United States Patent [19]

Cummings et al.

[11] Patent Number: 5,441,996

[45] Date of Patent: Aug. 15, 1995

[54] SINGLE PACKAGE IONIC EMULSION POLYMERS AND THEIR PREPARATION

[75] Inventors: Lowell O. Cummings, San Anselmo; Patrick A. Terrizzi; Norman Gac, both of San Francisco, all of Calif.

[73] Assignee: Adhesive Coatings Co., San Mateo, Calif.

[21] Appl. No.: 184,758

[22] Filed: Jan. 21, 1994

Related U.S. Application Data

[63] Continuation of Ser. No. 967,018, Oct. 27, 1992, abandoned.

[51] Int. Cl.$^6$ .................. C08K 3/20; C08L 63/00
[52] U.S. Cl. ...................... 523/416; 528/93; 528/407
[58] Field of Search .............. 523/414, 416; 528/93, 528/407

[56] References Cited

U.S. PATENT DOCUMENTS

| | | |
|---|---|---|
| 2,201,927 | 5/1940 | Sorenson . |
| 2,528,359 | 10/1950 | Greenlee . |
| 2,528,360 | 10/1950 | Greenlee . |
| 2,811,495 | 10/1957 | Wittcoff . |
| 2,872,427 | 2/1959 | Schroeder . |
| 2,872,428 | 2/1959 | Schroeder . |
| 2,899,397 | 8/1959 | Aclony . |
| 2,909,448 | 10/1959 | Schroeder . |
| 3,050,493 | 8/1962 | Wagner . |
| 3,309,341 | 3/1967 | Abrahams . |
| 4,423,170 | 12/1983 | Waddill .................. 523/417 |
| 4,442,245 | 4/1984 | Weiss et al. ............ 523/401 |
| 4,490,510 | 12/1984 | Cummings . |
| 4,574,145 | 3/1986 | Cummings . |
| 4,659,787 | 4/1987 | Cummings . |
| 4,812,493 | 3/1989 | Cummings . |
| 4,824,927 | 4/1989 | Dobbelstein et al. . |
| 4,906,726 | 3/1990 | Cummings . |

OTHER PUBLICATIONS

Lee & Neville, Handbook of Epoxy Resins, 1967 pp. 2-6 and 2-7.

Primary Examiner—Melvyn I. Marquis
Assistant Examiner—D. Aylward
Attorney, Agent, or Firm—Laff, Whitesel, Conte & Saret

[57] ABSTRACT

One component water-based coatings, inks, adhesives and sealants comprising enhanced molecular weight epoxy emulsions and inactivated amines.

18 Claims, 1 Drawing Sheet

SINGLE PACKAGE IONIC EMULSION POLYMERS AND THEIR PREPARATION

This application is a continuation of application Ser. No. 07/967,018, filed Oct. 10, 1992, now abandoned.

BACKGROUND OF THE INVENTION

The present invention relates generally to one component or "single package" water-based coatings, inks, adhesives, and sealant compositions and, more particularly, to enhanced molecular weight single package epoxy emulsions for use in water-based coatings, inks, adhesives, and sealant compositions, and to methods for their manufacture. The present invention also relates to a novel method of curing such enhanced molecular weight epoxy emulsions, and to the novel cured epoxy resins produced thereby.

In one important embodiment, this invention relates to single package or one component water-based "maintenance finishes". Maintenance finishes are water-based coatings which can be applied to previously coated surfaces, to cement and cement block, to plaster, to metals such as steel, and to any other surfaces which are commonly coated with conventional epoxy coatings.

In another important embodiment, this invention relates to single package solvent-free and near solvent-free air dry and heat cure coatings, inks, adhesives, and sealant compositions for application, for example, to metals, to wood, to non-woven as well as woven fabric, and to paper. These coatings, inks, adhesives, and sealant compositions may be used in factory fabrication and factory finishing of such end products as trucks, automobiles, coil aluminum and steel, containers, appliances, tools, doors, windows, siding, paneling, cabinets and shelving, garments, carpets, and such other end uses where appearance, hardness, toughness, chemical resistance, controlled rate of cure, and low VOC (volatile organic compounds) are particularly desirable.

In still another important embodiment, this invention relates to single package water-based coatings which can be applied to asphalt and concrete surfaces as a barrier and containment coating or as a safety marking material or traffic paint.

Environmental considerations have had a profound effect on the use and development of new coatings, inks, adhesives, and sealants, including the organic and inorganic binders which are widely used in them. In confined production lines, for example, electrodeposition, powder, and radiation-cure coatings, adhesives and sealants are increasingly being used to reduce or eliminate VOC concerns. However, large structure applications such as tanks, highways, food and chemical and heavy manufacturing plants cannot benefit from these technologies since they cannot be brought indoors to assembly lines, but rather must be painted in the field.

Self-curable compositions comprising amino-containing polymers and epoxy functional polymers are known in the art. This is typically achieved by capping the amino group with a ketone to form a ketamine which upon exposure to atmospheric moisture re-activates the amine. Unfortunately, the epoxideamine reaction has serious disadvantages in that it must be water-free, and it must necessarily contain and emit ketone solvent into the atmosphere as the coating cures and becomes insoluble.

Two component curable compositions comprising epoxy polymers and polyamine curatives currently are the standard in the art. Indeed, the dominant technology in high performance maintenance coatings for large structure applications is based upon polyamine cured epoxy coatings. The leader or so-called standard of performance coatings are solvent thinned solid epoxies cured with solvent thinned aminated dimer acids. There are, however, three major objections to such two component systems.

First, there is an objection to atmospheric solvent emissions. In order to dissolve the resins and to reduce the viscosity of formulated materials to application viscosity, large quantities of solvent are required, which may violate applicable emission requirements. Second, there are objections to organic solvents that are used as reducers and thinners, e.g., xylene, toluene, and glycol ethers, which are hazardous chemicals targeted for control or elimination because of their toxicity. Thus, the disclosure of low or no VOC water-borne epoxies to replace the current solvent-based epoxies will not only reduce atmospheric contamination by hundreds of millions of pounds of volatile organic compounds but will simultaneously eliminate the toxic chemical solvents. Third, there is an objection to the lengthy ingestion period and thus lost labor hours required after component mixing in using the current solvent-based epoxies.

Efforts have been made to equal the performance of solvent systems by emulsifying liquid epoxy resins or solvent-thinned solid resins and to cure them with emulsified or water-soluble amines. These efforts have met with limited success, at best, due to problems encountered on both the epoxy side and the amine side of such systems.

On the epoxy side, there are molecular weight and molecular configuration limitations. Solid epoxy resins in the molecular weight range of about 800 are necessary to achieve desired performance properties when amine cured coatings are prepared under ambient conditions, to achieve desired performance properties. Liquid resins with molecular weights in the range of about 390 and cured with similar amine technology simply will not yield the desired performance properties. Further, the molecular configuration is limited to relatively few commercially available epoxy resins such as bisphenol-epichlorohydrin condensates. Finally, currently available emulsified epoxies have stability problems.

The in situ polymerization and molecular enhancement of polyepoxide or diepoxide in water has not been disclosed in the context of coatings, inks, adhesives and sealants applied by brush, roll, spray, and electrodeposition as a viable alternative to the methods and compositions described.

There is very little information in the literature regarding reactions to increase the molecular weight of polyepoxides or diepoxides through homopolymerization or through the reaction between the oxirane and amine hydrogen, or still further through the reaction between the oxirane and ionic compounds such as those generated from sodium, potassium, ammonium hydroxide, etc. Chapter 5 of Lee and Nevil, entitled "Epoxy Resins" describes the many reaction potentials of the oxirane ring but does not discuss or explain possible ionic in situ polymerization.

On the polyamine side, there are a number of severe limitations to the in situ polymerization and molecular enhancement of polyepoxide or diepoxide in water. For example, in order to be water miscible with the waterborne epoxy, the polyamine must be either a water solution, a water emulsion, or a combination of the two.

Those skilled in the art, however, recognize that it is extremely difficult to develop stable polyamine emulsions as a result of the very high viscosity of many water-soluble polyamines in the desired molecular weight range.

In the field application of maintenance finishes, the mixed components must be workable for a minimum of four hours and preferably eight hours. Yet, the mixed materials, upon evaporation or removal of water, must cure rapidly.

The present inventors have developed useful resinous materials obtained by emulsion polymerization of epoxide in an alkaline media, stopping the reaction through neutralization and then curing this enhanced molecular weight epoxy with the addition of amine curatives. The resulting materials lend themselves particularly to making two component water-borne enhanced molecular epoxy coatings, inks, adhesives, and sealants.

However, while these enhanced molecular weight emulsion polymers, while possessing many outstanding properties, even these unique two component systems fail to satisfy the needs or desires of many end users who require or demand single or one package products.

It is most propitious that the present inventors have now developed enhanced molecular weight epoxy polymers that can be made as one component, or single package systems.

SUMMARY

The composition of the present invention comprises one component, which, when exposed to the atmosphere permitting evaporation of water, self-cures to form end products usable as coatings, inks, adhesives and sealants.

The principal component of the single package composition comprises a water-borne enhanced molecular weight epoxide self-cured with inactivated amines which are activated upon the evaporation or removal of the water. In the discussion which follows, the term "amines" is intended to refer to simple amines and polyamines. The composition is generated by first emulsion polymerizing epoxide in an alkaline amine-containing medium, stopping the reaction through neutralization and inactivating the amines. When the resulting composition is spread in a thin film layer, water evaporates thereby activating the amines in composition and quickly curing the epoxy. Thick layers of the composition in which there is little or no water evaporation, will not cure.

In addition, in order to optimize the application, cure, or physical properties of the end product, the single package composition may be modified with pigments or other particulate matter, reactive or non-reactive resins and polymers, wetting agents, solvents, pigment grinding aids, or flow control agents.

Accordingly, it is an object of the present invention to provide stable enhanced molecular weight epoxy water-borne ionic emulsion polymers.

It is another object of the invention to provide enhanced molecular configuration epoxy water-borne ionic emulsion polymers.

It is still a further object of the invention to provide one package component water-based coatings, inks, adhesives, and sealant compositions with little or no VOC.

Yet another object of the invention to provide two component water-based coatings, inks, adhesives, and sealant compositions with low or no toxic or hazardous organic solvents and paint thinners.

It is yet another object of the invention to provide odor-free single component amine cured water-based epoxy systems that cure at room temperature.

These and other objects of the present invention together with the various advantages thereof will become apparent to those skilled in the art from the detailed disclosure of the present invention as set forth below.

DESCRIPTION OF THE INVENTION

THE EPOXY IONIC EMULSION

The first step in producing the unique composition of the present invention is the preparation of an epoxy ionic emulsion by dispersing an oxirane (or epoxy containing) liquid resin in water with the aid of a wetting agent to form an oil-in-water emulsion. This emulsion may be prepared using any suitable method such as that described in U.S. Pat. No. 3,669,900 in diameter. The average resin particle size will lie in the range of about 0.1 to 5 microns in diameter and preferably will be about one micron in diameter.

The water-borne resin particles are then reacted with amine derivatives, or other bases such as amines, sodium hydroxide, potassium hydroxide. In the presence of excess water, these amine derivatives are ionic compounds of the general formula:

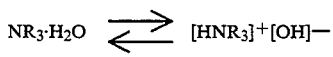

where R is a hydrogen or an organic group. It is believed that the epoxy resin in this second step is in the form of finely divided resin spheres suspended in water and that the $[HNR_3]^+$ $[OH]^-$ ionic compounds cause the resin particles each to polymerize as a resin sphere, preferably having, on average, a diameter of about one micron. Surprisingly, these spheres do not change significantly in size, either during the emulsion polymerization, or afterwards.

The molecular enhancement is believed to begin with the formation of a homopolymer having an approximate structure as follows:

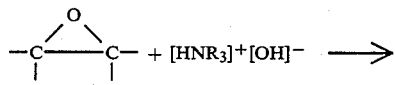

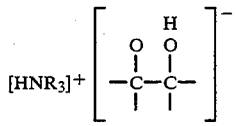

where R is hydrogen or an organic group.

In all likelihood, as is shown in the following, there is a much smaller but competing reaction when amines are employed as the generator/contributor of the $[OH]^-$ group:

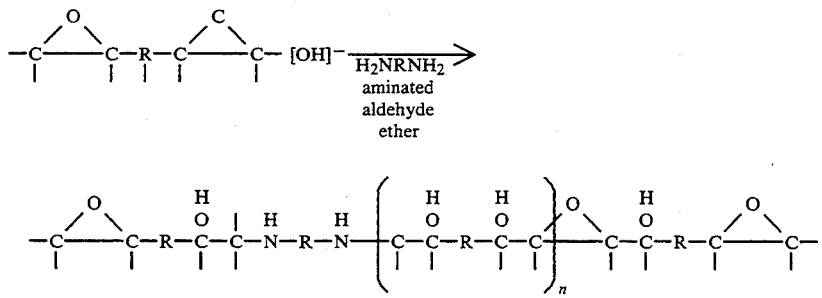

where Rx may be a urea formaldehyde core or hexamethylene diamine, as discussed below.

The pH of the emulsion, upon addition of the base and during the polymerization should initially be in the range of about 9 to 14 and preferably about 10 to 13.0. After an initial exotherm, the pH begins dropping and emulsion polymerization proceeds under controlled conditions until the reaction is stopped. Polymerization may stopped at any point by bringing the pH to below about 7, thus rendering the reacting species too weak to continue to propagate. By this method, one can tailor the molecular weight to the desired properties of the end polymer. This is shown pictorially in FIG. 1 which is a graph of Molecular Weight/Reaction Time/Film Properties in which the x-axis shows linearly advancing time (units dependent on reactants and reaction parameters) and the y-axis shows linearly advancing polymerization to the formation of a powder at the y-axis value of "1".

The dispersed polymer particles can be formed into continuous hardened films by spreading the final emulsion into a thin layer and allowing the water to evaporate. As a matter of proof of reaction, if the epoxy emulsion with no added base were spread out side-by-side with the present ionic emulsion material, the dramatic change in film clarity and tack would be noted.

The variables in the preparation of suitable ionic epoxy emulsions are choice of (1) epoxy, (2) wetting agents, (3) chemical base, (4) neutralizing acid, (5) emulsion solids concentration (6) emulsion particle size, and (7) reaction time and temperature.

The liquid epoxide resin which is the starting point in the preparation of these ionic polymers may vary considerably in chemical structure. The simplest liquid epoxy resin which can be used in the practice of this invention will be free of functional groups other than epoxide or epoxide and hydroxyl groups and will contain at least 3 carbon atoms as illustrated by 1,2-epoxy propane. More complex liquid epoxy resins which can be used in the practice of the invention include, for example, polyglycidyl ethers of bisphenol or saturated bisphenol, polyether derivatives of polyhydric phenols containing epoxide groups, and epoxy containing vinyl polymers in solution or latex form. Those skilled in epoxy technology will be able to choose the epoxy resin from any of the myriad well-known epoxy resins.

Other useful epoxy-containing resins include higher molecular weight materials which may be solids at room temperature. While such higher molecular weight materials are more difficult to emulsify in water, they may nevertheless be rendered suitable for use in the practice of the present invention through proper formulation with solvent and heat.

Three examples of specific liquid polyepoxides which may be used in the practice of this invention include: 2,2-bis(paraphenol) propane (also known as bisphenol A) and aminated aldehyde ether chain extended epoxies of bisphenol F described in U.S. Pat. No. 4,490,510, Examples 10 and 11 in Table 1.

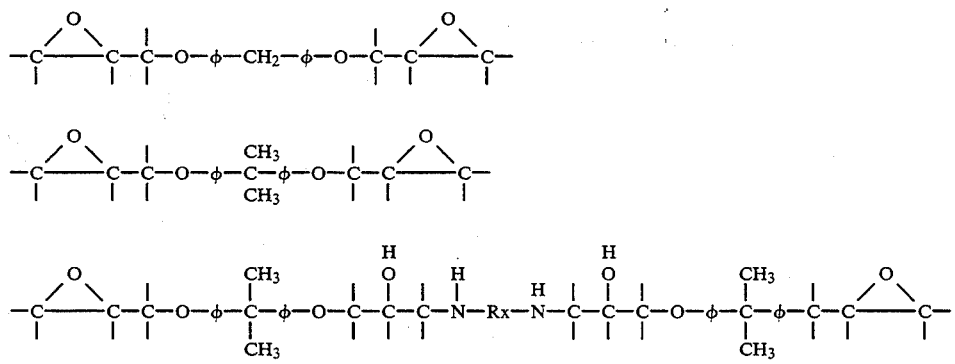

where Rx is an organic group.

In a preferred embodiment, the epoxy material is a diepoxide and is the condensation product of epichlorohydrin and bisphenol A with a molecular weight of 380 or weight per epoxy ("WPE") of 190, and a viscosity of 10,000 to 20,000 cps.

A wetting agent or combination of wetting agents must be used in forming the ionic epoxy emulsion, preferably at a level of about 0.1 to 10% by weight and most preferably at a level of about 5% by weight. The wetting agent(s) should be stable over a pH range of about 3 to 14. The wetting agents serve several functions, including to enable the formation and the continued stability of the initial emulsion, to enable preparation of the desired particle size emulsion, and to assist the flowout in the formation of the final film. Whereas there are many materials which could function at varying concentrations to meet these requirements, the wetting agents chosen should have an HLB above about 15. CapCure 65, a non-ionic wetting agent which is believed to be a stearic acid ester of polyethylene glycol having an HLB of about 18 is one preferred wetting agent when used at 5% solids by weight based upon epoxy solids. In a particularly preferred embodiment, the CapCure 65 is used together with 0.2% by weight, based on solids, of a polyethyleneoxide fluorochemical sulfamide non-ionic wetting agent available from 3M as FLUORAD FC-170-C, to greatly enhance leveling and minimize pinholes in the final film.

The reaction rate, viscosity of the emulsion, and film characteristics are heavily influenced by three variables: emulsion solids concentration, emulsion particle size, and reaction time and temperature. The amount of water that must be present for ionic polymerization to take place must substantially exceed the quantity of water necessary to completely form the amine hydrate. Thus, the preferred range of solids varies from about 5 to 90 percent by weight based on the weight of the emulsion and preferably ranges from about 40% to 85%. It is believed that average particle sizes as low as 0.1 micron will yield the desired molecular enhancement and further that average particle sizes as high as 5 microns or more can be employed. The preferred average particle size, however, is one micron. Finally, as to time and temperature, as those skilled in the art will recognize, time and temperature dynamics vary for each specific epoxy and each specific amine or base employed in catalyzing the reaction and will have to be optimized on a case-by-case basis.

Additionally, it is noted that a high rate of polymerization at low temperatures is a characteristic of ionic polymerization, and the more basic the ion, the better it serves to initiate chains. Thus, by varying the [OH—] activity and concentration by way of using different types and concentrations of mineral bases and amines, variations in final film properties occur. Useful polymers can be made with potassium hydroxide, sodium hydroxide and other mineral bases which produce a pH in excess of about 9.0.

Generally, the amine for the polymerization step should be a chosen from the group consisting of primary or secondary amines. In fact, while any amine could be used, the amines discussed below as useful curatives are presently preferred for use in the polymerization step. In one particularly preferred embodiment of the invention, the amine is hexamethylene diamine.

The Amine Curatives

Figure 1:
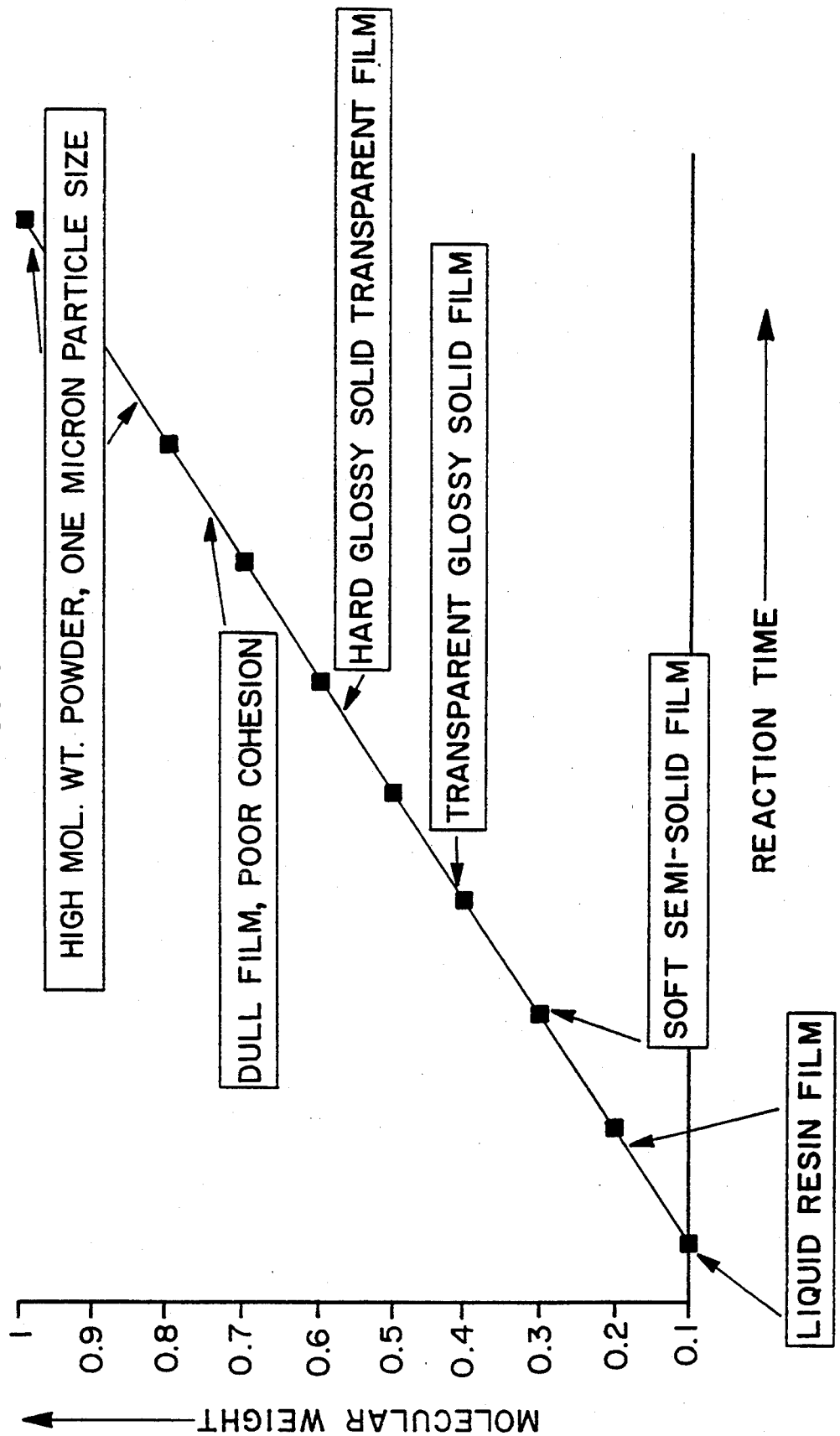
FIG. 1 is a graph of Molecular Weight/Reaction time/Film Properties in which the X-axis shows/linearly advancing time and the Y-axis shows linearly advancing polymerization.

The amine curatives are as essential component of the composition of the present invention.

The amines may be chosen from among primary, secondary and tertiary amines and further may be monoamine, diamine, triamine, and tetramine structures. The simplest is ammonia. The presently preferred amine is hexamethylene diamine. Other illustrative examples include monoethanol amine, hexamethylene diamine, commercial isomers of hexamethylene diamine, trimethyl hexamethylene diamine, N-aminoethyl piperazine, 1,5 aminomethyl pentane diamine, isophorone diamine, 1,2-diamine cyclohexane, xylene diamine, oleyl diamine, methylene dianiline, 2,4 bis(p-amino benzyl)analine, polyoxypropylene diamines and triamines available from Texaco Chemical under the trademark Jeffamine. Fatty amine diamines and triamines available from Sherex Corp. under the trademark Adogen, diethylene triamine and triethylene tetramine may also be used.

The amine may comprise the non-gel reaction product of (I) aldehyde ether monomer, with (II) an amine or amines chosen from the group consisting of primary, secondary and tertiary amines. The structure and synthesis of preferred aminated urea formaldehyde ether monomers from this group, described in part in U.S. Pat. Nos. 4,490,510, 4,574,145, and 4,659,787, includes the reaction product of aminated aldehyde ether, hexamethylene diamine and urea formaldehyde (U.S. Pat. No. 4,490,510, Example 10 in Table 1) and the reaction product of aminated aldehyde ether, hexamethylene diamine and Jeffamine D400 reacted with urea formaldehyde (U.S. Pat. No. 4,490,510, Example 11 in Table 1). Other preferred amine curing agents include the "non-gel" reaction products prepared by reacting one and one half moles of hexamethylene diamine, one half mole of a polyoxypropylene diamine, and one mole of N,N'-bis(methoxymethyl) uron.

Aqueous emulsions of water-insoluble amines may also be used. Specific amine adducts which are the reaction product of a liquid epoxy resin, such as Epon 828 (condensation product of epichlorohydrin and 2,2' paraphenoxypropane also (known as "bisphenol A")), and a fatty diamine such as tridecyl propyl ether diamine, are particularly suitable as curing agents. As noted earlier, polymerization may be stopped at any point by bringing the pH to below about 7, rendering the reacting species too weak to continue to propagate. This is done by adding acid. Sulfuric, phosphoric, formic, acetic, and lactic acids, among others, are effective to halt polymerization when used at stoichiometric ratios of at least one equivalent per active [OH]$^-$ or amine hydrogen and preferably at a 1:2 or higher stoichiometric equivalent level.

The acid addition is believed to perform two functions: (1) Without the active [OH]$^-$ homopolymerization is stopped and (2) since there is a large reservoir of unreacted amine present, the excess amine hydrogen is rendered inactive with this same acid at the same time. Although the mechanisms are not understood, it is thought that because the ions initiating propagation of the polymerization reaction as well as the active hydrogen groups on the amine are neutralized, the reaction in the package is stopped or proceeds only very very slowly. However, when the material is spread into a thin film, or water is removed as in evaporation from a thin film layer, the $[NR_4]^+$ change to $NR_3 + H_2O$ and the $NR_3$ reacts with the epoxide in the usual oxirane ring opening-amine reaction mechanism. The proof of this mechanism is driven home by the fact that thick layers (which do not give up water) will not cure. Since the material is usable for several months or perhaps even years, it is truly a self-curing one component epoxy system.

In brief, this has great practical value since the mix of polymerized epoxy emulsion exists in a water solution of $[NR_4]^+ + [OH]^-$ reacts at a slow and reasonably controlled rate when in the water phase but the water-free films from this mix cure in a short time as the $NR_3$ is reformed. The $NR_3$ as such is a very strong epoxy curing agent. This allows a system which is contained in a single package as a mixed emulsion but cures quickly as a water-free film.

In one embodiment of the invention some or all of the acid in the system comes from carbonation of the water in the emulsion. In this embodiment, as the water is withdrawn from the material, the COOH dissociates and is evaporated in the form of $CO_2$.

The epoxide-containing resins may be modified to optimize certain characteristics of the end product such as intercoat adhesion, flexibility, chemical resistance, surface feel, and mar resistance. Useful modifiers include synthetic latexes, alkyds, low molecular weight resin emulsions, epoxy ester emulsions, cationic and non-ionic asphalt emulsions, waxes and wax-like materials.

Typical useful synthetic latexes include the numerous latexes used in paints, inks, adhesive materials and sealants, such as polyvinyl acetate latexes, vinyl acrylic latexes, acrylic latexes, styrene-acrylic latexes and styrene-butadiene latexes.

Useful low molecular weight resin emulsions may be made from any water-dispersible polymer or copolymer resin of molecular weight under about 5000. For example, low molecular weight polyethylene wax-like materials which are emulsifiable in water can be used, such as Allied Signal Corporation's AC-6, a homopolymer of polyethylene with a molecular weight of about 2000 and AC 540, a polyethylene/acrylic acid copolymer with a molecular weight of about 3200.

EXAMPLES

1. PREPARATION OF SINGLE COMPONENT MAINTENANCE COATING COMPOSITION

Step 1: Prepare Epoxy Emulsion

Liquid epoxy resin (Epon 828) was emulsified using a planetary beater (Hobart mixer) as described in U.S. Pat. No. 3,669,900. This produced an oil-in-water emulsion with a resin content of 85-90% solids and the balance a non-ionic emulsifier-water mix. More particularly, into a 3 quart Hobart mixing bowl there were added 1000 grams of Epon 828, 154 grams of Capcure 65, and 4 grams of 3M fluorocarbon wetting agent FC-170-C. The mixture was beaten at high speed until a uniform thixotropic cloudy mass was formed. Then, 200 grams of water were set aside.

100 grams of the set aside water were then added to the thixotropic mass which was then beaten to generate an oil-in-water "mayonnaise-like" emulsion. In order to confirm that an oil-in-water emulsion was formed, a very small piece of this "mayonnaise" was added to 100 cc. of water. If it dispersed, the formation of an emulsion was confirmed; if it stuck to a spatula and the sides of the container, an emulsion was not formed.

If 100 grams of water failed to achieve the emulsion, an additional 50 grams of water were added and beat in and the product tested again. In the unlikely event that a total of 150 grams of water did not produce the desired emulsion, an additional 50 grams of water were added and the procedure repeated.

Once the oil-in-water emulsion was achieved, any remaining water of the original 200 grams were added followed by an additional 1000 grams of Epon 828. This mixture was beaten at high speed and emulsion particle size checked by examining a sample of very dilute emulsion on a microscope slide, i.e., set up a slide+sample+glass cover plate, using a 400X microscope with an eyepiece scale showing 2 microns per division.

When the desired average particle distribution of one micron was achieved, the emulsion was diluted with water to the desired level of epoxy resin solids.

Step 2: Polymerize Epoxy Emulsion

An epoxy emulsion was prepared per Step #1 above. An amine or an amine in combination with other basic substances was stirred into the emulsion. The quantity of amine added was sufficient to cure the un-reacted epoxide groups. Immediately upon initiating this addition, the pH of the system increased from 7.0 into the range of 11 to 13. No change in dispersion properties, viscosity, or dispersion particle size were noticed. The polymerization was allowed to proceed until the desired polymer/film property/molecular weight or "end point" was achieved after which the polymer emulsion mass was neutralized with acid. The time of reaction was about 24 hours at room temperature.

Step 3: Polymer End Point Determination

FIG. I was used to determine the point in time at which the emulsion mass was to be neutralized with acid to stop the reaction. Small samples of the mass were taken at time intervals and drawn down on black, sealed hiding chart paper to observe the progress in polymerization to the desired molecular weight/film properties.

| TIME (minutes) | OBSERVATION |
|---|---|
| Start | Very liquid resinous film |
| Start + 1 | Liquid film, |
| Start + 2 | Soft semi-solid film, |
| Start + 3 | Transparent, glossy, tacky film, |
| Start + 4 | Transparent, glossy, solid-(slight tack) film |
| Start + 5 | Hard, glossy, solid, transparent film, |
| Start + 6 | Hard, glossy, solid, translucent film, |
| Start + 7 | Dull film, poor cohesion, |
| Start + 8 | Powder, when heated will fuse to glossy solid, and |
| Start + 9 | High mol. weight powder, one micron avg. particle |

For optimum performance of the final product, it was observed that the acid should be added, under agitation, at Start+5, i.e., just as the film was about to become tack-free.

Step 4: Acid Neutralization

The reaction was stopped when the pH was reduced below 7 by the addition of acid. The acid addition performed two functions: (1) Without the active $[OH]^-$, homopolymerization was stopped and (2) since there was a large reservoir of un-reacted amine present, the excess amine hydrogen was rendered inactive through reduction of the pH to below about 7.0 and preferably to about 3.0. Upon aging, the emulsion drifted up in pH to 7 and higher, although the more stable materials were achieved at or near pH 7.

2. PREPARATION OF SINGLE COMPONENT CLEAR WATER-BORNE EPOXY

Charge 1000 grams of Epon 828, 154 grams of Capcure 65, and 4 grams of 3M fluorocarbon wetting agent FC-170-C into a 3 quart Hobart mixing bowl. As the emulsification proceeded, an additional 1000 grams of Epon 828 were added. The emulsion, prepared as per Example 2, gave the desired one micron particle size. It was adjusted to 65% solids with water and set aside.

To 365 grams of the above emulsions, 16.6 grams of 70% hexamethylene diamine were slowly added, under agitation. The pH increased from 7 to 13. A slight exotherm was noted. Over an 8 hour period, 1 gram samples were removed and evaluated for the advancing of molecular weight as per Example 1, Step 3. above.

At the time that the proper "end point" was reached, approximately 6 hours, 41.1 grams of a 45% solution of formic acid was stirred in slowly.

This material was ready for further compounding into finished products.

The material itself and films of the material were colorless and odorless and contained no solvents or other volatile organic materials.

| Raw Material | Weight (Grams) |
| --- | --- |
| Dow DER 331 | 225.0 |
| Hexamethylene Diamine (70%) | 16.6 |
| Capcure 65 | 14.6 |
| Formic Acid (45%) | 41.1 |
| Water | 48.85 |
|  | 345.8 |

3. SINGLE PACKAGE WATER-BASED EPOXY WHITE TRAFFIC MARKING PAINT

The wet ingredients of the pigment paste, as set out below, were charged into a Cowles Mixer. Into the vortex, titanium dioxide was sifted followed immediately by sifting in the silicon dioxide. If prior to adding all of the pigment the paste became too puffy, an additional increment of formic acid was added. Mixing was continued to achieve a smooth paste as shown in a draw-down on a Hegman gauge. The polymer emulsion was then added and mixing continued at very low speed until a homogeneous product was obtained.

| Raw Material | Weight (Grams) |
| --- | --- |
| Pigment Paste |  |
| Titanium Dioxide (TR-92) | 210.0 |
| Silicon Dioxide (MinUSil 10) | 420.0 |
| Capcure 65 | 5.6 |
| BYK-032 | 1.7 |
| Formic Acid (45%) | 0.9 |
| Water | 210.0 |
|  | 848.2 |
| Emulsion Binder |  |
| Example 2 Clear Product | 346.2 |
|  | 1194.4 |

Since this formula was similar to a normal low gloss epoxy maintenance finish, the material was sprayed on clean steel, clean aluminum, and phosphated steel panels, allowed to cure for 7 days and then given a series of tests normally utilized in evaluating epoxy finish coatings. The coating was smooth, low gloss, 3H pencil hardness, showed no cracks or loss of adhesion on a conical mandrel, withstood a 12 inch/lb. reverse and direct impact and was not-softened by 50 MEK (methyl ethyl ketone) solvent rubs. The material was softened on acetic acid spot tests, but was not affected in alkali spot tests.

This white traffic marking paint was spray-applied at approximately a 7 mil dry film level to asphalt and concrete highways as an edge strip. Under the application conditions, (Southern California with a road surface temperature of approximately 105° F., air temperature of 80° F., and 35% relative humidity), the material dried to the touch in less than two minutes. Specific tests were run related to tire marking or transfer, 3 to 5 minutes after application, and there were no marks. Traffic was introduced to the road system in less than 15 minutes.

While the present invention is described above in connection with preferred or illustrative embodiments, these embodiments are not intended to be exhaustive or limiting of the invention. Rather, the invention is intended to cover all alternatives, modifications and equivalents which may be included within it spirit and scope, as defined by the appended claims.

What we claim is:

1. A heat hardening or air drying single component water-based composition suitable for use as a coating, ink, adhesive, or sealant, comprising the combination of the reaction product of an enhanced molecular weight epoxy ionic emulsion and an acid inactivated amine chosen from the group consisting of primary, secondary and tertiary amines or ammonia, said enhanced molecular weight epoxy polymer being prepared by polymerizing water-borne epoxy resin particles in the presence of an alkaline substance.

2. The composition of claim 1 in which the epoxy is free of functional groups other than epoxide or epoxide and hydroxyl groups and contains at least 3 carbon atoms.

3. The composition of claim 1 in which the epoxy is chosen from the group consisting of a polyglycidyl ether of bisphenol A and a polyglycidyl ether of saturated bisphenol A.

4. The composition of claim 1 in which the enhanced molecular weight epoxy is a polyether derivative of a polyhydric phenol containing epoxide groups.

5. The composition of claim 1 in which the epoxy is a polyglycidyl ether of bis(paraphenol)methane.

6. The composition of claim 1 in which the epoxy is an aminated aldehyde ether chain extended epoxy with terminal epoxide groups.

7. The composition of claim 1 in which the epoxy material is a diepoxide having a weight per epoxy of 190 and a viscosity of 10,000 to 20,000 cps. obtained as the condensation product of epichlorohydrin and 2,2-bis(-paraphenol)propane.

8. The composition of claim 1 in which the alkaline substance is chosen from the group consisting of KOH, NaOH, and a primary or secondary amine.

9. The composition of claim 1 in which the alkaline substance is hexamethylene diamine.

10. The composition of claim 1 in which the alkaline substance is an aminated aldehyde ether chain extended epoxy with terminal epoxide groups.

11. The composition of claim 1 in which said amine is chosen from the group consisting of monoamine, diamine, triamine, and tetramine with primary, secondary or tertiary amine functionality.

12. The composition of claim 1 in which said enhanced molecular weight epoxy ionic emulsion is reacted with ammonia.

13. The composition of claim 1 in which said amine is the non-gel reaction product of an aldehyde ether monomer with an amine or amines chosen from the group consisting of primary, secondary and/or tertiary amines and/or fatty polyfunctional amines.

14. The composition of claim 1 of which said amine is hexamethylene diamine.

15. The composition of claim 1 in which said amine is an amine adduct of an epoxy with a fatty polyfunctional amine.

16. The composition of claim 1 in which pigments are introduced into said composition at a level of about 5 to 55 percent.

17. The water-based composition of claim 1 in which particulate matter is introduced into or onto said composition at a level of 3 to 15 pounds per gallon of said composition.

18. A heat hardening or air drying single component water-based composition suitable for application to asphalt and concrete surfaces as a safety marking material or traffic paint comprising the combination of the reaction product of an enhanced molecular weight epoxy ionic emulsion and an acid inactivated amine chosen from the group consisting of primary, secondary and tertiary amines or ammonia, said enhanced molecular weight epoxy polymer being prepared by polymerizing water-borne epoxy resin particles in the presence of an alkaline substance.

* * * * *